United States Patent
Smith

(10) Patent No.: US 10,413,971 B1
(45) Date of Patent: *Sep. 17, 2019

(54) SAFE MODE CROSS SLIDE SYSTEM

(71) Applicant: Jeffery A. Smith, Houston, TX (US)

(72) Inventor: Jeffery A. Smith, Houston, TX (US)

( * ) Notice: Subject to any disclaimer, the term of this patent is extended or adjusted under 35 U.S.C. 154(b) by 18 days.

This patent is subject to a terminal disclaimer.

(21) Appl. No.: 15/871,487

(22) Filed: Jan. 15, 2018

Related U.S. Application Data

(63) Continuation-in-part of application No. 15/596,903, filed on May 16, 2017, now Pat. No. 9,868,182, which is a continuation-in-part of application No. 15/299,184, filed on Oct. 20, 2016, now Pat. No. 9,649,695.

(60) Provisional application No. 62/306,195, filed on Mar. 10, 2016.

(51) Int. Cl.

| | |
|---|---|
| *B23Q 1/62* | (2006.01) |
| *B23Q 9/02* | (2006.01) |
| *B23B 29/02* | (2006.01) |
| *B23B 29/034* | (2006.01) |
| *B23Q 1/48* | (2006.01) |
| *B23Q 9/00* | (2006.01) |
| *G05B 19/048* | (2006.01) |

(52) U.S. Cl.
CPC ...... *B23B 29/025* (2013.01); *B23B 29/03435* (2013.01); *B23Q 1/4819* (2013.01); *B23Q 1/621* (2013.01); *B23Q 9/0042* (2013.01); *B23B 2270/32* (2013.01); *B23Q 9/02* (2013.01); *G05B 19/048* (2013.01)

(58) Field of Classification Search
CPC ..... Y10T 82/125; Y10T 82/128; Y10T 82/22; Y10T 82/2512; Y10T 82/2522; Y10T 82/2529; B23B 3/265; B23B 3/26; B23B 5/08; B23B 5/16; B23B 5/161; B23B 5/162; B23B 5/163; B23B 5/167; B23B 5/168; B23B 2215/72

See application file for complete search history.

(56) References Cited

U.S. PATENT DOCUMENTS

| | | | | |
|---|---|---|---|---|
| 107,918 | A * | 10/1870 | Jones | B23B 5/00 82/173 |
| 4,235,135 | A * | 11/1980 | McElroy | B23B 29/02 82/15 |
| 4,758,121 | A * | 7/1988 | Kwech | B23B 29/02 408/104 |
| 5,050,291 | A * | 9/1991 | Gilmore | B23B 3/265 29/560 |

(Continued)

FOREIGN PATENT DOCUMENTS

| | | | | |
|---|---|---|---|---|
| DE | 3406602 | A1 * | 9/1985 | ............. B23B 3/265 |
| GB | 2240735 | A * | 8/1991 | ............... B23B 3/26 |

*Primary Examiner* — Alan Snyder
(74) *Attorney, Agent, or Firm* — Nolte Intellectual Property Law Group

(57) ABSTRACT

A safe mode cross slide system having a cross slide with a back plate, a front plate and a saddle. The back plate can have a pair of end caps, a pair of linear guides, a first ball screw, a first gear box, a first servo motor, a first drive, and a first manual feed knob and the front plate can have a pair of end caps, a pair of linear guides, a second ball screw, a second gear box, a second servo motor, a second drive, and a second manual feed knob. The system can have a power supply, a communications hub with a processor and data storage.

20 Claims, 11 Drawing Sheets

(56) References Cited

U.S. PATENT DOCUMENTS

| | | | | |
|---|---|---|---|---|
| 2002/0040629 A1* | 4/2002 | Bedi | ............... | B23Q 15/02 |
| | | | | 82/118 |
| 2004/0187657 A1* | 9/2004 | Smith | ............... | B23B 3/265 |
| | | | | 82/123 |
| 2004/0187658 A1* | 9/2004 | Moruzzi | ............ | B23B 5/162 |
| | | | | 82/123 |
| 2008/0060490 A1* | 3/2008 | Sorensen | .......... | B23B 29/022 |
| | | | | 82/1.11 |
| 2011/0041658 A1* | 2/2011 | Weinberg | .......... | B23B 5/162 |
| | | | | 82/113 |
| 2011/0083537 A1* | 4/2011 | Place | ............... | B23B 3/265 |
| | | | | 82/1.11 |

* cited by examiner

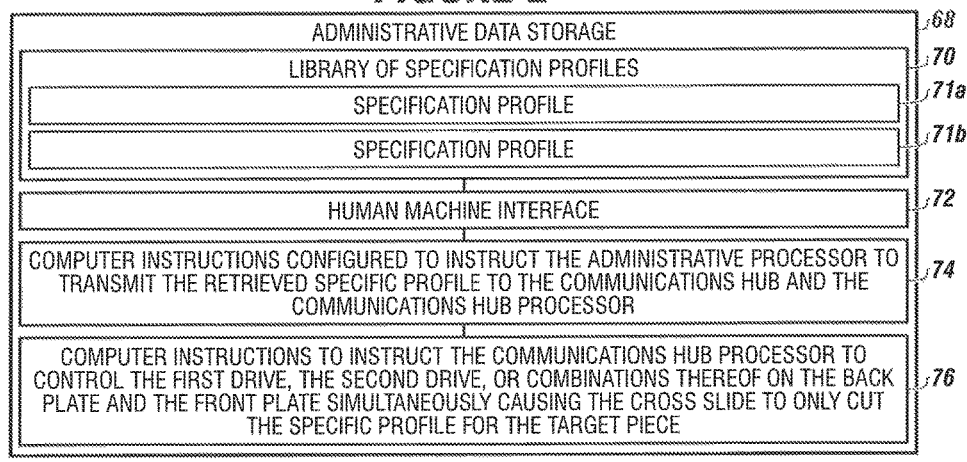

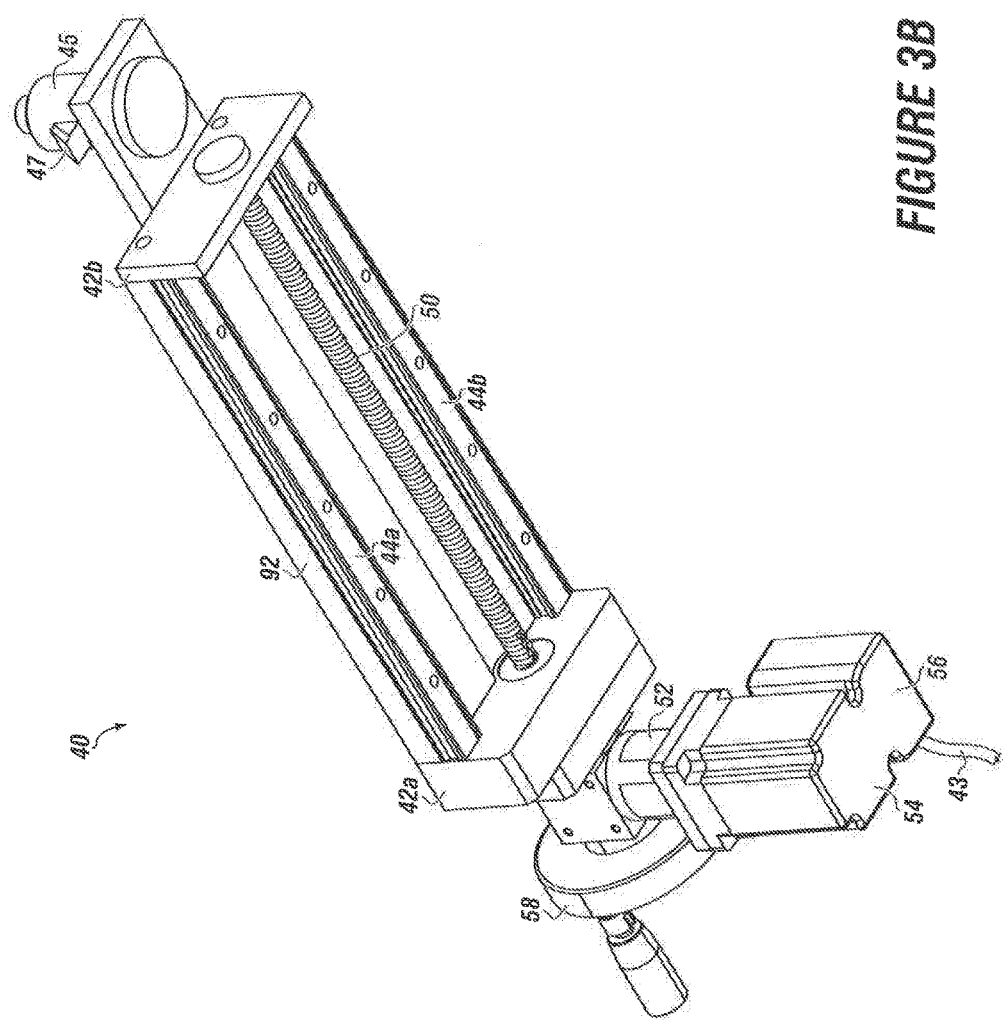

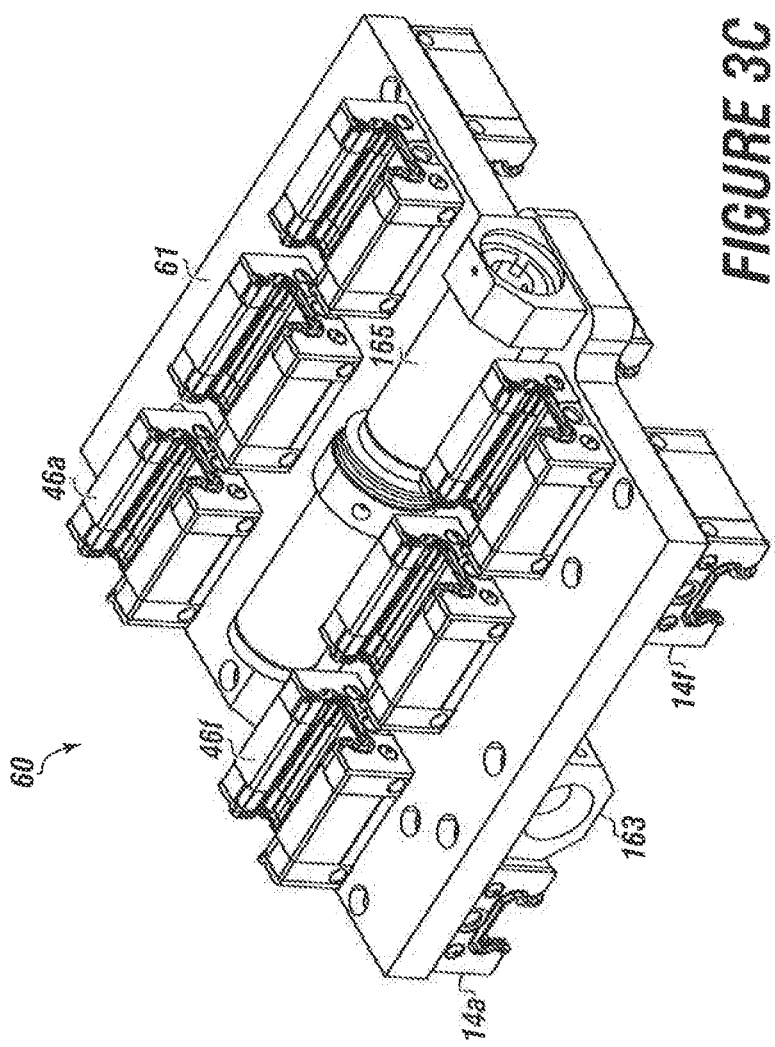

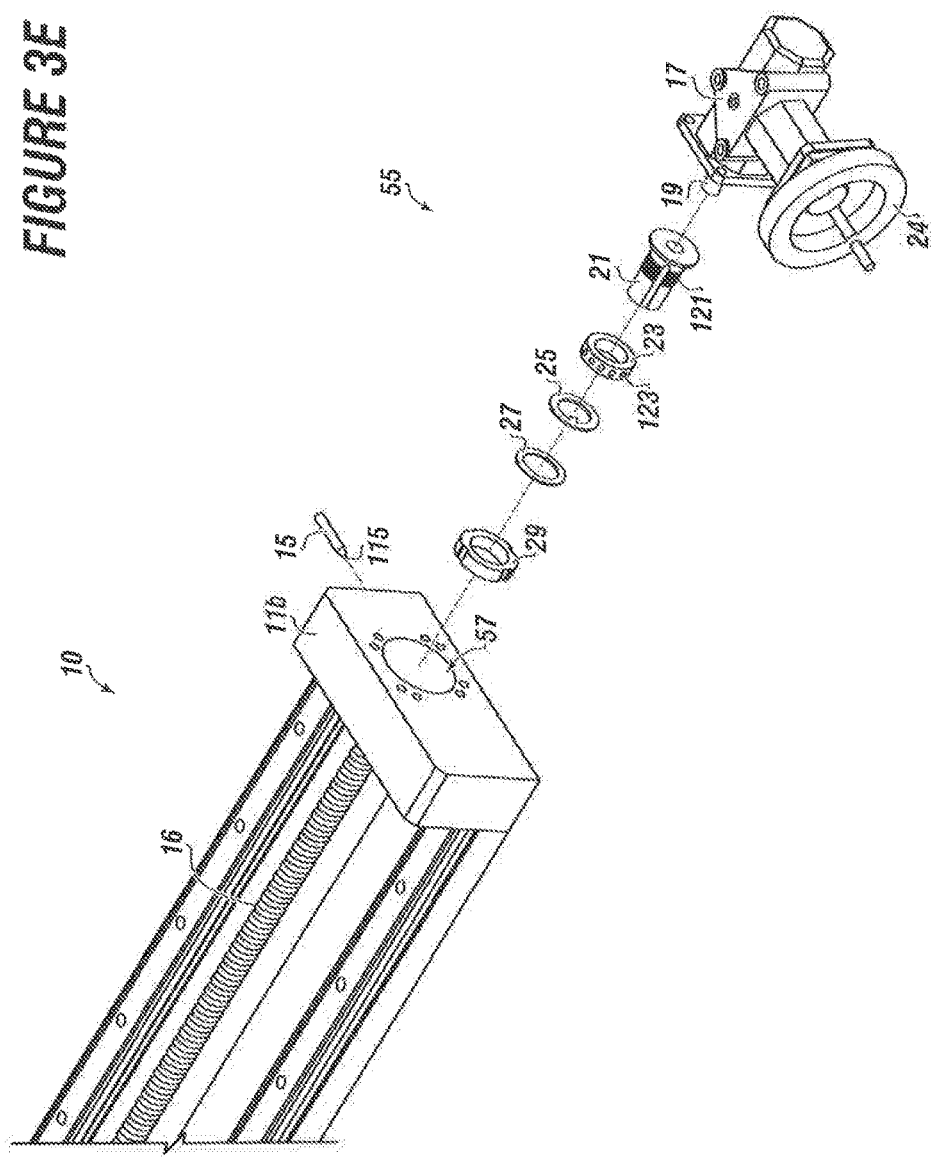

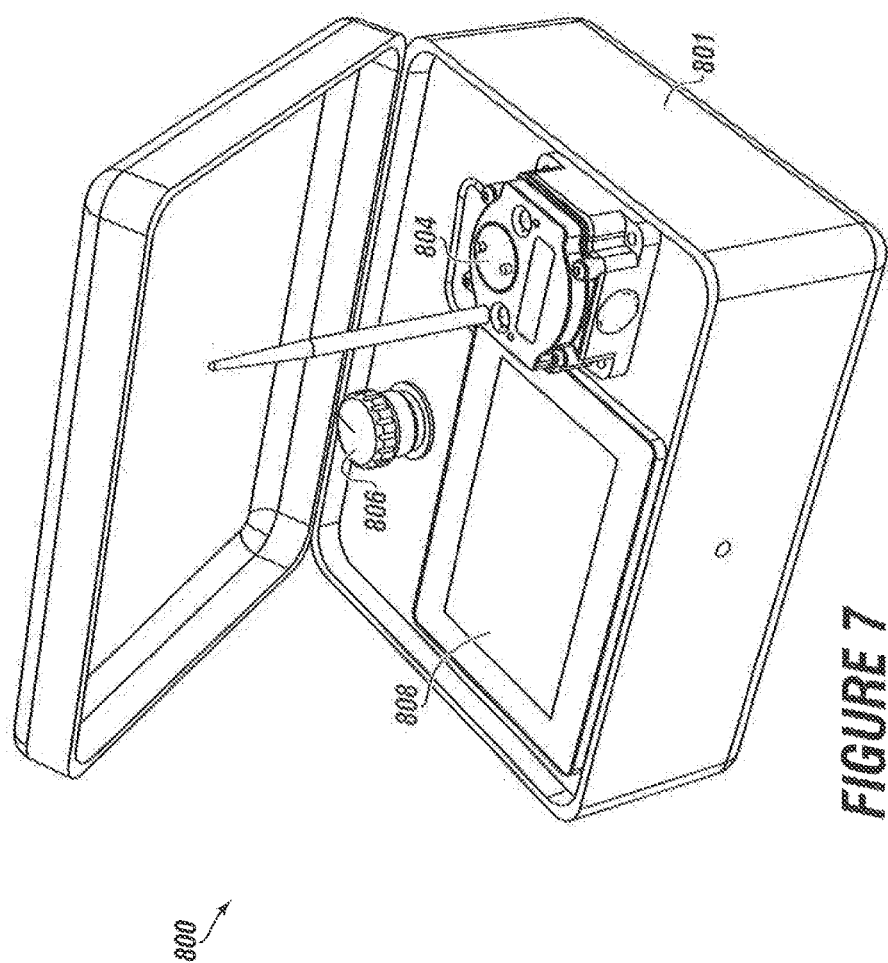

SAFE MODE CROSS SLIDE SYSTEM

CROSS REFERENCE TO RELATED APPLICATION

The current application is a Continuation in Part of and claims priority to and the benefit of co-pending U.S. Non-Provisional patent application Ser. No. 15/596,903 filed on May 16, 2017, entitled "SAFE MODE CROSS SLIDE SYSTEM" and also claims priority to and benefit of co-pending U.S. Non-Provisional patent application Ser. No. 15/299,184 filed on Oct. 20, 2016, entitled "AUTOMATED CROSS SLIDE SYSTEM," and claims priority to and the benefit of U.S. Provisional Patent Application Ser. No. 62/306,195 filed on Mar. 10, 2016, entitled "AUTOMATED CROSS SLIDE SYSTEM". These references are hereby incorporated in its entirety.

FIELD

The present embodiments relate to a safe mode cross slide system. In particular, embodiments of the disclosure pertain to a safe mode cross slide system useable for machining surfaces of a target piece.

BACKGROUND

Industrial processes worldwide utilize a wide range of equipment, piping, and connections therebetween (such as flanged connections) that are often governed by one or more specifications. In the U.S., such specification can be provided by, for example, the American Petroleum Institute (API) or American National Standards Institute (ANSI).

As an example, a metal flange connection for a heat exchanger can be exposed to extreme process conditions, as well as environmental conditions, that eventually warps, pits, erodes, or causes some other event to the flange face(s) that results in the flange face surface being out of specification.

During a process shutdown, the piece of equipment is removed, brought to a machine shop, where a conventional machining tool is connected and manually operated by an operator to remachine the flange face to spec. The use of a conventional machining tool has a considerable impact on production time, as the applicable piece of equipment typically has to be removed from its location and brought to a machine shop for connection to a non-portable machining tool.

Conventional machining is also prone to operator error that results in a remachined surface that is still out of spec or rendered defective (causing additional impact on production time). Because the operator must manually operate the machine there is an inherent safety risk to the operator, especially when the machining process occurs in a hazardous environment (such as in the presence of VOC's or other flammables).

A need exists for a versatile cross slide for (re)machining surfaces that operates in safe mode. There is a need for a portable cross slide system that operates in safe mode that reduces production downtime and stops death of operators. There is a need for a safe mode cross slide that increases accuracy and tolerance of re-machining in meeting a requisite specification There is a need for a safe mode cross slide that resurfaces (re-machines, etc.) flange connections, radial fits, piping, turbines, pumps, and other surfaces common to industrial processes, such as a high pressure flange connection on a blowout preventer onsite.

The present embodiments meet these needs.

SUMMARY OF DISCLOSURE

Embodiments of the disclosure pertain to a safe mode cross slide system for cutting that can include a cross slide with a back plate having a back plate support member; a pair of back plate end caps disposed on opposite ends of the back plate support member; a pair of back plate linear guides mounted longitudinally to the back plate support member; a first ball screw; a first gear box mounted to at least one of the pair of back plate end caps; a first servo motor connected between the first gear box and a first drive; a front plate mounted to the back plate; a pair of front plate end caps mounted to the front plate support member; a pair of front plate linear guides mounted longitudinally to the front plate support member and traverse to the back plate support member; a second ball screw; a second gear box mounted to at least one of the pair of the front plate end caps; a second servo motor connected between the second gear box and a second drive; and a saddle mounted between the back plate and the front plate.

There can be a power supply electrically connected to both the first drive and the second drive; a communications hub in communication with the first drive, the second drive, or both the first drive and the second drive. A communication hub processor with computer readable media and instructions in the computer readable media to communicate bidirectionally to independently control the first drive and the second drive causing the safe mode cross slide to cut the target piece.

There can be a mount for supporting the safe mode cross slide on the target piece or in the target piece. The mount can be an inner diameter mount, an outer diameter mount, or a portable boring bar.

Yet other embodiments of the disclosure pertain to a safe mode cross slide system for cutting a target piece that can include a cross slide having a back plate that can have a back plate support member; a pair of back plate end caps mounted on opposite ends of the back plate support member; a pair of back plate linear guides mounted longitudinally to the back plate support member; a first ball screw mounted in parallel with the pair of back plate linear guides and projecting through the pair of back plate end caps; a first gear box mounted to at least one of the pair of back plate end caps, and operatively engaged with the first ball screw; a first servo motor connected between the first gear box and a first drive; and a first manual feed knob connected to an end of the first ball screw that is opposite the first gear box.

The safe mode cross slide system can include a front plate mounted to the back plate that can have a front plate support member; a pair of front plate end caps mounted to the front plate support member; a pair of front plate linear guides mounted longitudinally to the front plate support member and traverse to the back plate support member; a second ball screw mounted in parallel with the pair of front plate linear guides, and projecting through the pair of front plate end caps; a second gear box operatively connected to the second ball screw, and mounted to at least one of the pair of the front plate end caps; a second servo motor connected between the second gear box and a second drive; and a second manual feed knob protruding from the second gear box and operatively connected to the second ball screw.

The safe mode cross slide system can include a saddle mounted between the back plate and the front plate that can have a saddle support member; a plurality of back plate linear bearings mounted to the saddle support member, and configured to engage the back plate support member; and a plurality of front plate linear bearings mounted to the saddle support member on a side opposite the plurality of back plate linear bearings, and configured to engage the front plate.

There can be a power supply electrically connected to both the first drive and the second drive; a communications hub in communication with the first drive, the second drive, or both the first drive and the second drive, a communications hub processor, to communicate bidirectionally with first and second servo motors. The processor communicates with a data storage which is computer readable media.

There can be a mount for mounting the safe mode cross slide to the target piece. The mount can be an inner diameter mount, an outer diameter mount, or a portable boring bar.

These and other embodiments, features and advantages will be apparent in the following detailed description and drawings.

BRIEF DESCRIPTION OF THE DRAWINGS

The detailed description will be better understood in conjunction with the accompanying drawings as follows:

FIG. 2 shows a detail of an administrative data storage usable in other cross slide system according to one or more embodiments.

FIG. 3B is a perspective top view of a front plate of a safe mode cross slide system according to one or more embodiments.

FIG. 3C is a view of a saddle of the safe mode cross slide according to one or more embodiments.

FIG. 3E is an isometric component breakout view of a clutch assembly useable with a back plate for engagement with a ball screw according to one or more embodiments.

FIG. 7 depicts a remote control usable with different embodiments of the system according to one or more embodiments.

Figure 1:
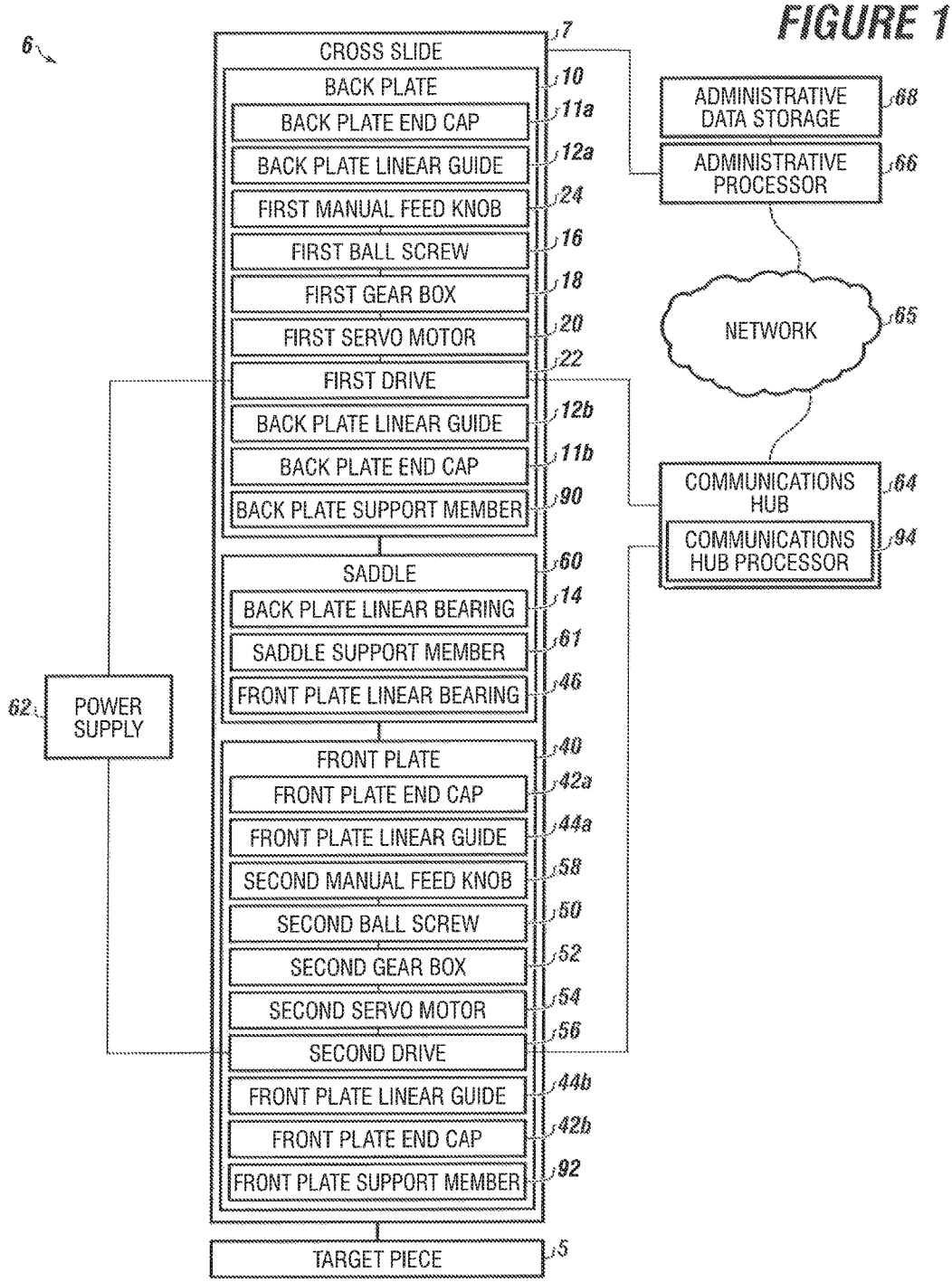
FIG. 1 is a diagram of an embodiment of a cross slide system according to one or more embodiments.

The present embodiments are detailed below with reference to the listed Figures.

DETAILED DESCRIPTION OF THE EMBODIMENTS

Before explaining the present apparatus and system in detail, and methods related thereto, it is to be understood that the apparatus, system, and related method are not limited to the particular embodiments and that they can be practiced or carried out in various ways.

The present embodiments generally relate to a safe mode cross slide system.

This safe mode cross slide can operate in safe mode in the event of loss of a wireless connection preventing the runaway of the cutting tool in the tool mount and prevent possible damage to the workpiece and prevent physical damage or death to the operator.

A benefit of the safe mode cross slide is that of limiting additional costs to clients The safe mode cross slide is advantageous over other commercially available devices by limiting explosions and fires caused by other types of device jamming or otherwise malfunctioning as this device can continue to operate even without a wireless connection.

The invention of a safe mode cross slide will continue a path to ensure a proper specification is cut to high or low pressure type connections even in the event of a loss of communication which in turn will assure the tolerances are met eliminating possibility of chemical spills.

The present embodiments further relate to a cross slide for use with a mount. In embodiments, the mount can be one of an inner diameter mount facing machine, an outer diameter mount facing machine, and a portable boring bar.

The present embodiments further relate to a safe mode cross slide system for use on flat and profiled surfaces. 'Use' can pertain to machining, remachining, cutting, milling, etc.

In embodiments, the safe mode cross slide system can be used for cutting a target piece. The safe mode cross slide system can have a cross slide for engaging the target piece.

The safe mode cross slide system can have components and/or subcomponents made out of a material of construction that includes, but is not limited to steel, aluminum, bronze, composite, multi-material, or any other material suitable for operation of the system. Components and/or subcomponents can be manufactured, assembled, and so forth, as would be apparent to one of skill in the art, such as with a lathe or a mill.

Connections such as electrical, pneumatic, fittings, couplers, threading, and so forth to or between various components may not be shown or otherwise visible, but can be utilized or configured in a manner that would be apparent to one of skill in the art.

Terms

The term "data storage" refers to a non-transitory computer readable medium, such as a hard disk drive, solid state drive, flash drive, tape drive, and the like. The term "non-transitory computer readable media" excludes any transitory signals but includes any non-transitory data storage circuitry, e.g., buffers, cache, and queues, within transceivers of transitory signals. The data storage can be used to store the a plurality of computer instructions, wherein the computer instructions can instruct the administrative processor to perform various tasks, such as causing a servo motor(s) to actuate, turn off, speed up, slow down, etc.

The term "application" can refer to an 'app' for a computer, which can be a mobile device. The application can have computer software (or simply 'software'), that is part of a computer system that consists of encoded information or computer instructions.

The term "back plate" can refer to an assembly constructed over a flat plate that can have dimensions from, for example, 3 inches to 6 inches in width and 6 inches to 16 inches in length and can be made of a non-deformable metal.

The term "back plate end cap" can refer to removable end pieces, which can permit penetration of a ball screw (such as through a hole in the end cap).

The term "ball screw" can refer to a rod with threads, which can rotate (or be rotated) to move a cross slide along either a back plate or a front plate.

The term "portable boring bar" can refer to a machine with a cross slide that is usable to cut inner surfaces of a target piece.

The term "communications hub" can refer to a multi-port device for bidirectional receiving of commands and specification information or data from servo motors as well as transmitting location information of a back plate and a front plate of a safe mode cross slide.

The term "communications hub processor" can refer to a communications hub processor in communication with a communications hub. The communications hub processor is at least one of a remote communications hub processor in bidirectional communication with a network or a local communications hub processor.

The term "cross slide" can refer to a cutting member having the shape of a cross with an x-axis back plate approximately traverse (cross, crisscross, perpendicular, etc.) to a y-axis front plate. The cross slide can be movable or otherwise operated by computer instructions utilizing x and y coordinates.

The term "drive" can refer to a mechanism that controls or imparts rotation of a motor(s).

The term "front plate" can refer to an assembly constructed over a flat plate that can have dimensions in a range of from about 3 inches to about 6 inches in width and in a range of from about 6 inches to about 16 inches in length. The front plate can be made of a non-deformable metal.

The term "gear box" can refer to a multi-position gear box that allows a motor to turn in at least two speeds. The gear box can include or otherwise house requisite gearing.

The term "human machine interface" can refer to computer instructions, which present a display that can allow a human to interact with a computer and select a specification profile for cutting, and actuating a cutting process.

The term "inner diameter mount" can refer to a mount that has adjustable legs for fitting inside an object (such as a target piece) to be cut by a cross slide.

The term "library of profiles" can refer to a stored collection of specification profiles, wherein any particular specification profile can have a standard size including dimension requirements for one or more target pieces. A specification profile can be defined by a certain organization or body, such as ANSI or API. A specification profile can be in digital form for use with a computer or application (and related computer instructions).

The term "linear bearing" can refer to bearings mounted on a saddle that allow the saddle to move freely from another component, such as a linear guide.

The term "linear guide" can refer to a rail(s) mounted, such as longitudinally, on a back plate or front plate.

The term "machining" ("machine", "machined", etc.) can refer to re-machining, cutting, drilling, abrading, cutting, drilling, forming, grinding, shaping, etc. of a target piece.

The term "manual feed knob" can refer to a knob or other type of hand-accessible component that can be turned by hand.

The term "mount" can refer to a support on which a cross slide of the safe mode cross slide system can be attached. In embodiments, the mount can be an inner diameter mount, an outer diameter mount, or a portable boring bar.

The term "mounted" can refer to a connection between a respective component (or subcomponent) and another component (or another subcomponent), which can be fixed, movable, direct, indirect, and analogous to engaged, coupled, disposed, etc., and can be by screw, nut/bolt, weld, and so forth.

The term "network" can refer to any known network known in the industry to one of ordinary skill in the art, such as a global communication network, a local area network, a wide area network, a cellular network, a satellite network, or combinations thereof.

The term "outer diameter mount" can refer to a ring mount that engages a target piece on its outside.

The term "preset X distances of travel for the saddle" in safe mode can range from zero to 500 RMS rates of travel for the tool holder to cut a target piece and form a phonographic finish. For example, a preset X distance of travel for a 0.025 inch can be an RMS of 125. As another example if the preset X distance of travel is 0.012 inch can be an RMS of 63. For example, a preset X distance of travel for a 0.040 inch can be an RMS of 500. For example, a preset X distance of travel for a 0.0 inch can yield an RMS of 00.00.

The term "preset Y distances of travel for the saddle" are from zero to 500 RMS rates of travel for the tool holder to cut a target piece and form a phonographic finish and can be identical to the preset X distances of travel. Embodiments are contemplated that the preset X distances can be different from the preset Y distances of travel.

The term "processor" as used herein can refer to any known processor in the industry to one of ordinary skill in the art, such as a computer or similar processor, including but not limited to a processor for a tablet computer, a laptop, a cellular phone, or other portable processor which is remote to the cross slide.

The term "proximity switch" can refer to a switch (or sensor) configured to open or close an electrical circuit, or otherwise cause a signal to be sent, based on when the switch makes contact with, comes within a certain distance of, or otherwise senses, a target object. The proximity switch can use infrared, inductive, magnetic, or other suitable sensing capability. The signal can be communicated by a receiver-transmitter.

The term "power supply" can refer to a battery system, a battery, a power pack, a solar panel, a generator, a fuel cell, or any power supply known in the industry.

The term "saddle" can refer to a device mounted between a front plate and a back plate of a cross slide.

The term "safe mode" as used herein refers to operation of the cross slide assembly without a wireless connection but using the proximity sensors and the unique servo motors in a defined manner.

The term "servo motor" can refer to a motor usable in a cross slide. A servo motor can be a rotary actuator that allows for precise control of angular position. The servo motor can be coupled to a sensor(s) for position feedback. A servo motor can be operable with a servo drive, and can include a shaft for transferring motion.

The term "servo drive" can be a driver for a motor that uses a feedback sensor to precisely control the rotary position of the motor. A servo drive can receive a command signal from a control system, amplifies the signal, and transmits a servo drive signal to the servo motor in order to produce motion proportional to the command signal. The command signal can represent, for example, a desired velocity, a desired torque, or position. The sensor attached to the motor communicates the motor's status to the servo drive. The servo drive then compares the motor status with the commanded motor status. As necessary, the drive alters the voltage frequency, current, pulse width, or other applicable signal to the motor so as to correct for any deviation from the commanded status.

The term "specification profile", or sometimes 'specific' profile, can refer to any form of dimension or tolerance governed by an organizational body, such as API or ANSI. The specification profile can be in digital form for use by a computer and related software.

The term "target piece" can refer to a material, surface, etc. to be machined by the safe mode cross slide system. The target piece can be but is not limited to a flange, a flange face, a flange connection, a groove, a bore (such as of a pipe or pump), or other common metallic surfaces.

Example in Safe Mode:

A safe mode cross slide system for cutting a flanged face for a pipe connection in safe mode can include a cross slide.

The cross slide configured for safe mode operation has a back plate (element 10) that can be 8 inches by 36 inches of steel.

The cross slide can have a back plate support member (element 90) that can be 48 inches×8 inches×8 inches. In other examples, the back plate support member can be 4 inches wide and 20 inches long and 4 inches thick.

A pair of back plate end caps (element 11a and 11b) disposed on opposite ends of the back plate support member. The back plate end caps can be made from aluminum or steel.

The back plate has in this example would have a pair of back plate linear guides each 36 inches long and mounted longitudinally to the back plate support member.

The cross slide can have a first ball screw connected to a first gear box that is mounted to at least one of the pair of back plate end caps. The ball screw can be a hardened steel rod with threads.

A first servo motor which can have an operating range between 1 and 48 DC volts is connected between a first gear box and a first drive.

The first servo motor rotates the first ball screw in safe mode without engaging a second servo motor on the front plate that rotates a second ball screw. That is only one motor operate at a time in safe mode.

The cross slide configured for safe mode operation has a front plate mounted to the back plate. The front plate can also be 8 inches by 36 inches identical to the back plate.

A tool holder (shown as element 45) can be mounted to the front plate. The tool holder can be configured to securely hold a tool insert 47 which is configured to cut or weld the flanged face for a pipe connection.

The front plate has a pair of front plate end caps mounted to the front plate which can be identical to the back plate end caps, or sized differently if the front plate is a different size.

In this example, the cross slide has a pair of front plate linear guides mounted longitudinally to the front plate and traverse to the back plate support member. The front plate linear guides can be identical to the back plate linear guides.

The front plate has a second ball screw and a second gear box for operating the second ball screw. The second gear box is mounted to at least one of the pair of the front plate end caps.

A second servo motor is connected between the second gear box and a second drive and operates independently of the first servo motor.

A saddle is mounted between the back plate and the front plate and can have a size of 8 inches long by 8 inches wide and up to two inches thick.

A power supply is electrically connected to both the first drive and the second drive such as 24 for 48 volt DC motor that further powers the servo motors.

A communications hub is in communication with the first drive, the second drive, or both the first drive and the second drive.

The communications hub has a local communications hub processor, to communicate bidirectionally with the first and second servo motors.

The communications hub has a computer readable media with preset X distances of travel for the saddle; preset Y distance of travel for the saddle; and instructions in the computer readable media to instruct the local communications hub processor to control the first drive and the second drive independently in safe mode, causing the cross slide to only incrementally advance the saddle for the preset distances of travel.

In this example the first preset X distance of travel for the saddle can be the determined RMS finish, in this case, if the finish desired is a 16 RMS finish, and the distance travel can be 0.005 inch of travel.

In this example, the preset Y distance of travel for the saddle can be for an RMS finish of 125, and the distance travel could be 0.025.

The safe mode cross slide can have a mount for supporting the cross slide on the target piece or in the target piece, such as an inner diameter mount, like an inner diameter mount portable flange facing machine, an outer diameter mount such as a outer diameter mount portable flange facing, or a portable boring bar if the part to be cut was a large turbine or other component with a preexisting bore with a defined inner diameter.

In embodiments, the safe mode cross slide system has the preset X distances of travel for the saddle are from zero to 500 RMS rates of travel for the tool holder to cut a target piece and form a phonographic finish.

In embodiments, the safe mode cross slide system has the preset y distances of travel for the saddle are from zero to 500 RMS rates of travel for the tool holder to cut a target piece and form a phonographic finish.

Turning now to the Figures, FIG. 1 illustrates a diagram of the safe mode cross slide system for machining a target piece according to one or more embodiments of the disclosure.

The safe mode cross slide system 6 can have a cross slide 7, which can be used to machine a target piece 5.

A power supply 62 can be connected to one or both of a first drive 22 and a second drive 56. The power supply 62 can be electrically connected thereto, which can include the use of wiring, cabling, and so forth, as would be apparent to one of skill in the art.

A communications hub 64 can be proximate the cross slide 7 and can be in communication with the first drive 22 and the second drive 56. Communication can be through wired, wireless, or other forms of communicative connection.

In embodiments, the communications hub 64 can be in communication with a communications hub processor 94.

The communications hub processor 94 can be at least one of a remote communications hub processor in bidirectional communication with a network or a local communications hub processor.

The local communications hub processor can use manual switches to communicate bidirectionally with the first and second servo motors with a computer readable media with preset X distances of travel for the saddle, preset Y distance of travel for the saddle, and instructions in the computer readable media to instruct the communications hub processor to control the first drive and the second drive independently in safe mode, causing the cross slide to only incrementally advance the saddle for the preset distances of travel.

An administrative processor 66 with an administrative data storage 68 can also be in communication with the network 65. Communication can be through wired, wireless, or other forms of communicative connection.

In embodiments, the administrative processor 66 can be in communication with the cross slide 7. In embodiments, the communications hub 64 and the administrative processor 66 can be in communication with the first drive, the second drive, or both the first drive and the second drive. Communication can be through wired, wireless, or other forms of communicative connection.

The cross slide 7 can have a back plate 10 with a back plate support member 90, and a pair of back plate end caps 11a and 11b. The pair of back plate end caps 11a and 11b can be mounted to the back plate support member 90. The back plate 10 can have a pair of back plate linear guides 12a and 12b. The pair of back plate linear guides 12a and 12b can be mounted longitudinally to the back plate support member 90. The back plate 10 can include a first ball screw 16 mounted in parallel with the pair of back plate linear guides 12a and 12b. The first ball screw 16 can project or otherwise fit through (or within) each of the back plate end caps 11a and 11b. The back plate 10 can have a first gear box 18, which can be operably coupled to the first ball screw 16, as well as connected to one of the back plate end caps 11a and 11b. The back plate 10 can include a first servo motor 20, which can be operably connected with the first gear box 18 and the first drive 22. The first drive 22 can be a servo drive.

In embodiments, the back plate 10 can have a first manual feed knob 24. The first manual feed knob 24 can be connected to the first ball screw 16. In aspects, the first manual feed knob 24 can be connected to the first ball screw 16 on an opposite side from where the first gear box 18 is connected to the first ball screw 16.

The cross slide 7 can have a front plate 40. The front plate 40 can be mounted or otherwise positioned in a manner that is traverse (cross, crisscross, etc.) to the back plate 10. The front plate 40 can have a front plate support member 92. There can be a pair of front plate end caps 42a and 42b, which can be mounted to the front plate support member 92. The front plate 40 can have a pair of front plate linear guides 44a and 44b. The pair of front plate linear guides 44a and 44b can be mounted longitudinally to the front plate support member 92. In embodiments, the pair of front plate linear guides 44a and 44b can be mounted or otherwise positioned in a manner that is traverse to the back plate support member 90.

The front plate 40 can include a second ball screw 50. The second ball screw 50 can be mounted, including parallel with the pair of front plate linear guides 44a and 44b, in such a way that the second ball screw 50 projects or otherwise fits through (or within) each of a front plate end caps 42a and 42b. The front plate 40 can include a second gear box 52 mounted thereon. The second gear box 52 can be operably connected with the second ball screw 50. In addition or in the alternative, the second gear box 52 can be connected to one of the front plate end caps 42a and 42b. The front plate 40 can have a second servo motor 54. The second servo motor 54 can be connected between the second gear box 52 and the second drive 56. The front plate 40 can have a second manual feed knob 58. The second manual feed knob 58 can protrude from the second gear box 52, and can be connected to the second ball screw 50.

One or both of the motors 20 and 54, while energized, can be configured to act as a brake or comparable form of safety function.

The cross slide 7 can have a saddle 60 coupled with the first ball screw 16 and the second ball screw 50. In embodiments the saddle 60 can be simultaneously coupled with the first ball screw 16 and the second ball screw 50.

The saddle 60 can include a saddle support member 61, a set of back plate linear bearings 14, and a set of front plate linear bearings 46. The set of back plate linear bearings 14 can be mounted to the saddle support member 61 in a manner that is suitable to allow engagement between the saddle 60 and the back plate support member 90. The set of front plate linear bearings 46 can be mounted to the saddle support member 61 in a manner that is suitable to allow engagement between the saddle 60 and the front plate support member 92.

In embodiments, more than one linear bearing can be used for engagement with the front plate 40 and/or the back plate 10.

In embodiments, the power supply 62 can be electrically connected to both the first drive 22 and the second drive 56. The communications hub 64 can provide communications between the first drive 22, the second drive 56, the communications hub processor 94, and the network 65 separately or simultaneously.

FIG. 2 shows a detail of the administrative data storage according to one or more embodiments.

The administrative data storage 68 can have a library of specification profiles 70 (in digital form). In embodiments the library of specification profiles 70 can contain a plurality of specification profiles 71a and 71b. In embodiments, the specification profiles can be API profiles.

An example of a specification profile is an API specification pertaining to one or more dimensions of raised face flange height and width, minimum and maximum thickness of the flange, and specific tolerances of those dimensions.

The administrative data storage 68 can include a human machine interface (or HMI) 72. The human machine interface 72 can be suitable for accessing the library of specification profiles 70 and retrieving one or more of the plurality of specification profiles 71a and 71b. The human machine interface 72 can be accessed on a display, such as a touchscreen display, as well as a display of the administrative processor 66 and a display of a remote control. The display of the human machine interface 72 can be simultaneously viewed on multiple displays.

The administrative data storage 68 can have computer instructions 74 to instruct the administrative processor 66 to transmit the retrieved specific profile to the communications hub and the communications hub processor.

The administrative data storage 68 can have computer instructions 76 to instruct the communications hub processor to control the first drive, the second drive, or combinations thereof. In aspects, the computer instructions 76 can instruct the communications hub processer to control both the first drive and second drive in order to simultaneously cause the cross slide to only cut the specification profile for the target piece.

Figure 3A:
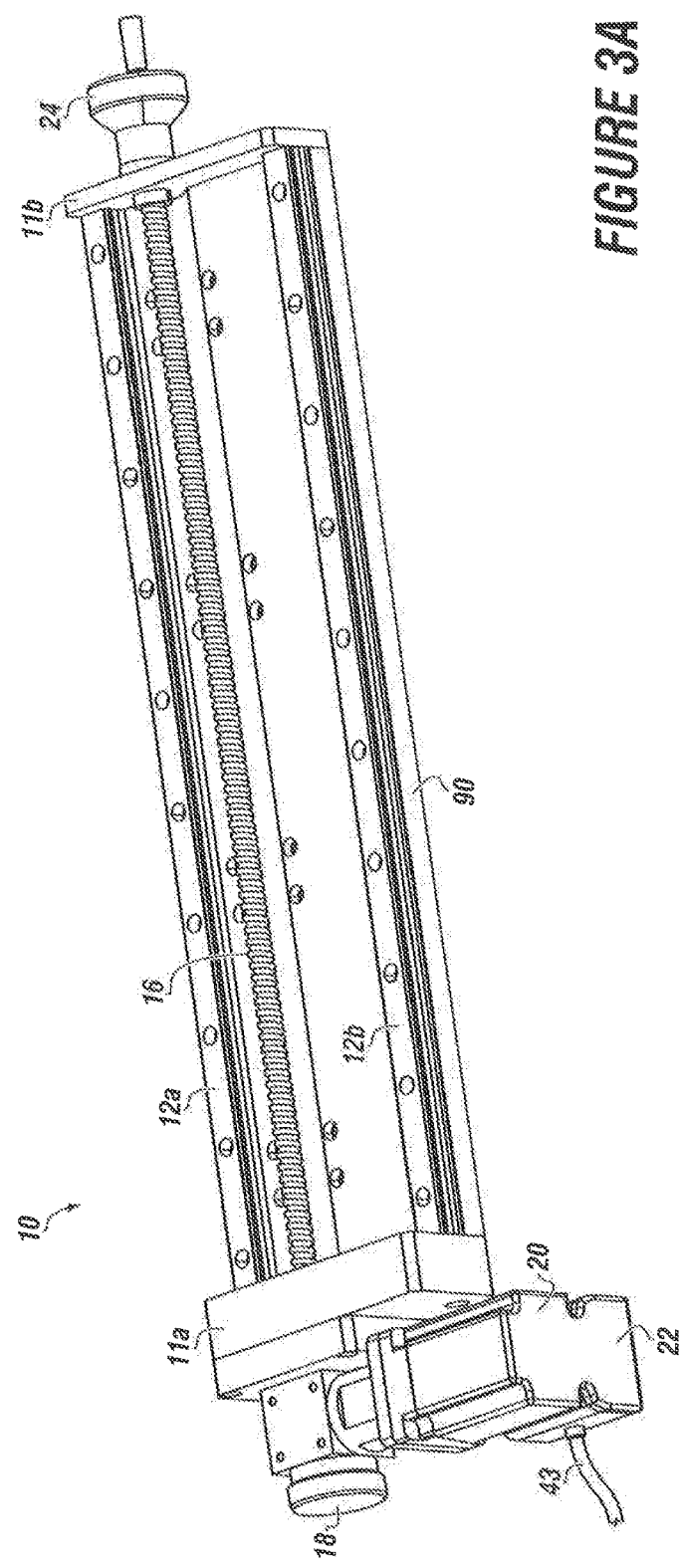
FIG. 3A is a perspective top view of a back plate of a safe mode cross slide system according to one or more embodiments.

FIG. 3A is a perspective top view of a back plate of the cross slide according to one or more embodiments.

The back plate 10 can have the back plate support member 90 and the pair of back plate end caps 11a and 11b. The pair of back plate end caps 11a and 11b can be disposed on an opposite end, respectively, of the back plate support member 90.

The back plate 10 can have a pair of back plate linear guides 12a and 12b. The pair of back plate linear guides 12a and 12b can be mounted longitudinally to the back plate support member 90 in a parallel manner. In embodiments, each back plate linear guide 12a and 12b can be mounted on opposite sides, respectively, of the back plate support member 90.

The first ball screw 16 can be mounted longitudinally and in parallel with the pair of back plate linear guides 12a and 12b. The first ball screw 16 can project, or otherwise fit, at least partially, through one or both of the back plate end caps 11a and 11b. The pair of back plate end caps 11a and 11b can have one or more holes disposed therein.

The first gear box 18 can have gearing operably connected with the first ball screw 16, such as in a manner that allows motion to be transferred there between. The first gear box 18 can be mounted to one of the back plate end caps 11a and 11b.

The first servo motor 20 can be operably connected between the first gear box 18 and the first drive 22. Thus, the first servo motor 20 can impart motion (such as rotation) to the first gear box 18 (and its gearing) that is ultimately transferred to the first ball screw 16. The first servo motor 20, the first drive 22, or other components connected with the back plate 10 can be energized via connection to a power source via wiring 43. Other wiring can be used, but for brevity is not shown here.

The first manual feed knob 24 can be connected to the first ball screw 16. The first manual feed knob can be connected to the first ball screw 16 on an end that is opposite the end where the first gear box 18 is connected.

FIG. 3B is a perspective view of a cross slide front plate according to one or more embodiments.

The front plate 40 can have the front plate support member 92. The front plate 40 can include one or more front plate end caps 42a and 42b connected to the front plate support member 92. The pair of front plate end caps 42a and 42b can be connected on opposite ends of the front plate support member 92. The front plate end caps 42a and 42b can include one or more holes disposed therein.

The front plate 40 can include one or more front plate linear guides 44a and 44b. The front plate linear guides 44a and 44b can be mounted to the front plate support member 92. The front plate linear guides 44a and 44b can be mounted longitudinally on opposite sides of the front plate support member 92. When the front plate 40 and the back plate are operably engaged, the front plate support member 92 and back plate support member can be positioned substantially traverse to each other.

The second ball screw 50 can be mounted onto the front plate support member 92. The second ball screw 50 can be mounted longitudinally and in parallel with the pair of front plate linear guides 44a and 44b. The second ball screw 50 can project, or otherwise fit, at least partially, through one or both of the front plate end caps 42a and 42b.

The second gear box 52 can have gearing operably connected with the second ball screw 50, such as in a manner that allows motion to be transferred there between. The second gear box 52 can be mounted to one of the front plate end caps 42a and 42b.

The second servo motor 54 can be operably connected between the second gear box 52 and the second drive 56. Thus, the second servo motor 54 can be operable to impart motion (such as rotation) to the second gear box 52 (and its gearing) that can ultimately be transferred to the second ball screw 50.

The second servo motor 54, the second drive 56, or other components connected with the front plate 40 can be energized via connection to a power source via wiring 43. Other wiring, cables, etc. can be used, but for brevity is not shown here.

The second manual feed knob 58 can be coupled with the second gear box 52. The second manual feed knob 58 can be coupled in a manner that allows operable engagement with the second ball screw 50, such that the second manual feed knob 58 can be rotated, and upon doing so, cause the second ball screw 50 to rotate.

A tool holder 45 can be mounted to the front plate support member 92. The tool holder can be configured to securely hold a tool insert 47.

FIG. 3C shows a saddle with a saddle support member according to one or more embodiments.

The saddle 60 can have a saddle support member 61, which can have a plurality of back plate linear bearings 14a-14f and a plurality of front plate linear bearings 46a-46f mounted thereto.

In embodiments, the saddle support member 61 can be a plate.

A front plate ball screw holder 163 and a back plate ball screw holder 165 can be connected to the saddle support member 61.

In embodiments, the saddle can contain the first ball screw positioned traverse to the second ball screw.

The ball screws can be threadingly engaged with the front plate ball screw holder 163 and the back plate ball screw holder 165.

Figure 3D:
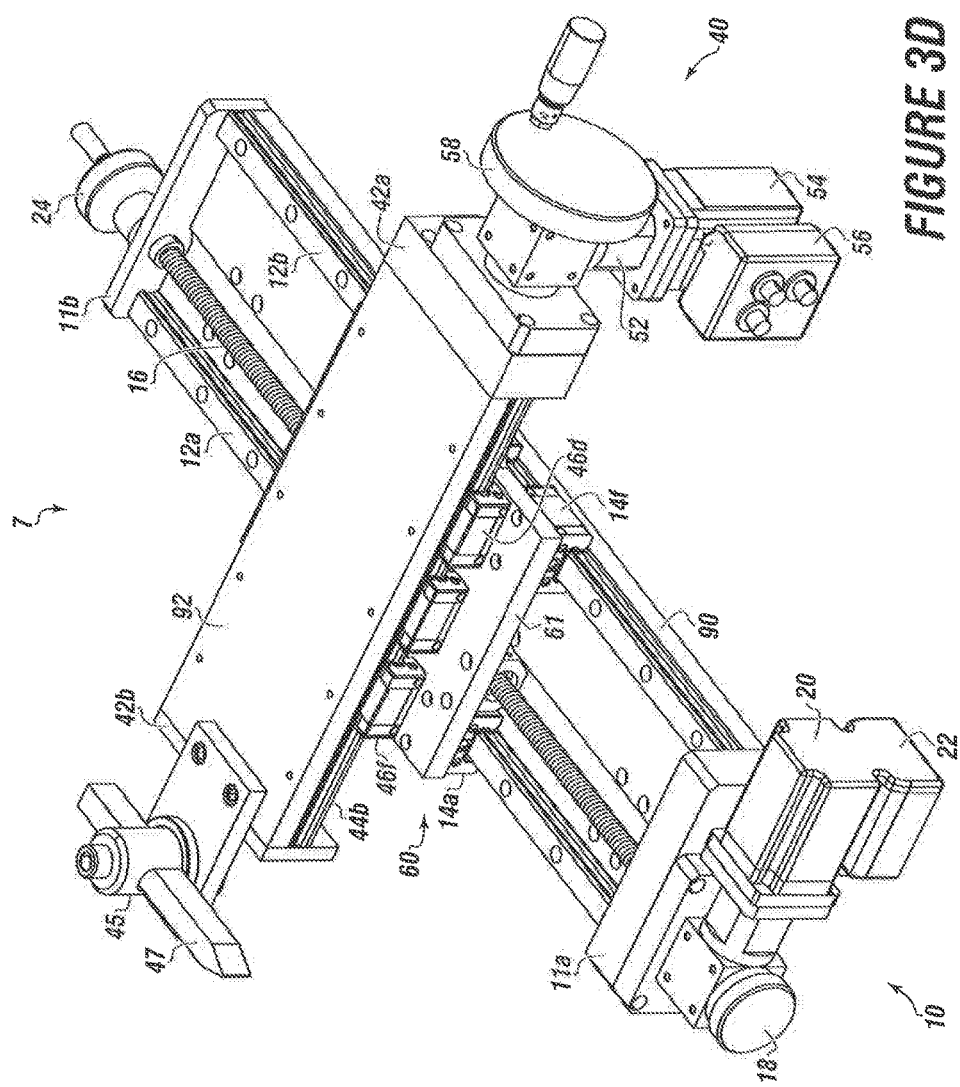
FIG. 3D is top view of an assembled safe mode cross slide system according to one or more embodiments.

FIG. 3D is an assembled view of the cross slide according to one or more embodiments.

The assembled cross slide 7 is shown with the back plate 10, the back plate support member 90, the pair of back plate end caps 11a and 11b, the pair of back plate linear guides 12a and 12b, the first ball screw 16, the first gear box 18, the first servo motor 20, the first drive 22 and the first manual feed knob 24. Wiring, cables, etc. for providing power or other utility to the cross slide 7 can be used, but for brevity is not shown here.

The assembled cross slide 7 is shown with the front plate 40, the front plate support member 92, the pair of front plate end caps 42a and 42b, the pair of front plate linear guides 44a and 44b (shown on FIG. 3B). The pair of front plate linear guides 44a and 44b can be mounted longitudinally to the front plate support member 92. The pair of front plate linear guides 44a and 44b can be traverse to the pair of back plate linear guides 12a and 12b of the back plate support member 90.

The second gear box 52 can engage the second ball screw (50, shown on FIG. 3B). The second gear box 52 can be mounted to one of the front plate end caps 42a and 42b.

The second servo motor 54 can be operably connected with the second gear box 52 and the second drive 56.

The second manual feed knob 58 can be connected, including operably, with the second gear box 52. The second manual feed knob 58 can be operably connected to the second ball screw (50, FIG. 3B). Accordingly, the second manual feed knob 58 can be usable to rotate the second ball screw.

The saddle 60 can engage the first ball screw and the second ball screw.

The saddle 60 can have the saddle support member 61. The saddle 60, which can be coupled with the back plate 10, can include a plurality of back plate linear bearings 14a-14f. The back plate linear bearings 14a-14f can be mounted to the saddle support member 61 for engaging the back plate support member 90.

The saddle 60 can have the plurality of front plate linear bearings 46d-46f. The front plate linear bearings 46d-46f can be mounted to the saddle support member 61 on a side opposite the plurality of back plate linear bearings 14a-14f. The front plate linear bearings 46d-46f can be used to provide movable engagement between the saddle 60 and the front plate support member 92.

FIG. 3E is an isometric component breakout view of a clutch assembly usable with a back plate for engagement with a ball screw according to one or more embodiments.

A clutch assembly 55 can be useful to prevent inadvertent movement of the saddle (60, FIG. 3D) connected thereto, as there is very little resistance between the ball nut(s) and ball screw(s), which can be prone to freewheeling. Inadvertent movement can cause severe damage to equipment or significant harm to an operator.

The clutch assembly 55 can include a coupler 21, a slide ring 23, one or more washers 25, one or more wafer springs 27, and a lock ring 29. The clutch assembly 55 can be configured to add resistance to movement of one or both ball screws 16 and 18, which results in the saddle 60 staying stationary. As shown, the coupler 21 can be configured for connection between a shaft 19 (extended from housing 17) and an end (not visible) of the ball screw 16. Motion of the manual feed knob 24 can thereby be transferable to ball screw 16 through the coupler 21 (via gearing and so forth).

The slide ring 23, one or more washers 25, and one or more wafer springs 27 can be positionable onto the coupler 21. The lock ring 29 can threadingly engage to the coupler threads 121. Tightness of the lock ring 29 onto the coupler 21 corresponds to the resistance (or tension) provided by the clutch assembly 55. Thus, the tighter the lock ring 29 is threaded into engagement with the one or more washers 25, the one or more wafer springs 27, and the slide ring 23, the more resistance provide by the clutch assembly 55 to hold ball screw 16 in place, thereby ensuring the saddle is held in place.

The coupler assembly 55 can be positionable into a hole 57 of at least one of the pairs of back plate end caps 11b. A set screw 15 can also be positionable into a set screw hole (not visible) of the back plate end cap 11b. An end 115 of the set screw 15 can engage one of a plurality of ring detents 123 of the slide ring 23. Thus the slide ring 23 can be held in place while the coupler 21 rotates. The slide ring 23, while the coupler 21 is movable therewith, helps provide resistance (tension, friction, etc.) within the clutch assembly 55 attributable to holding the saddle in place.

Figure 4:
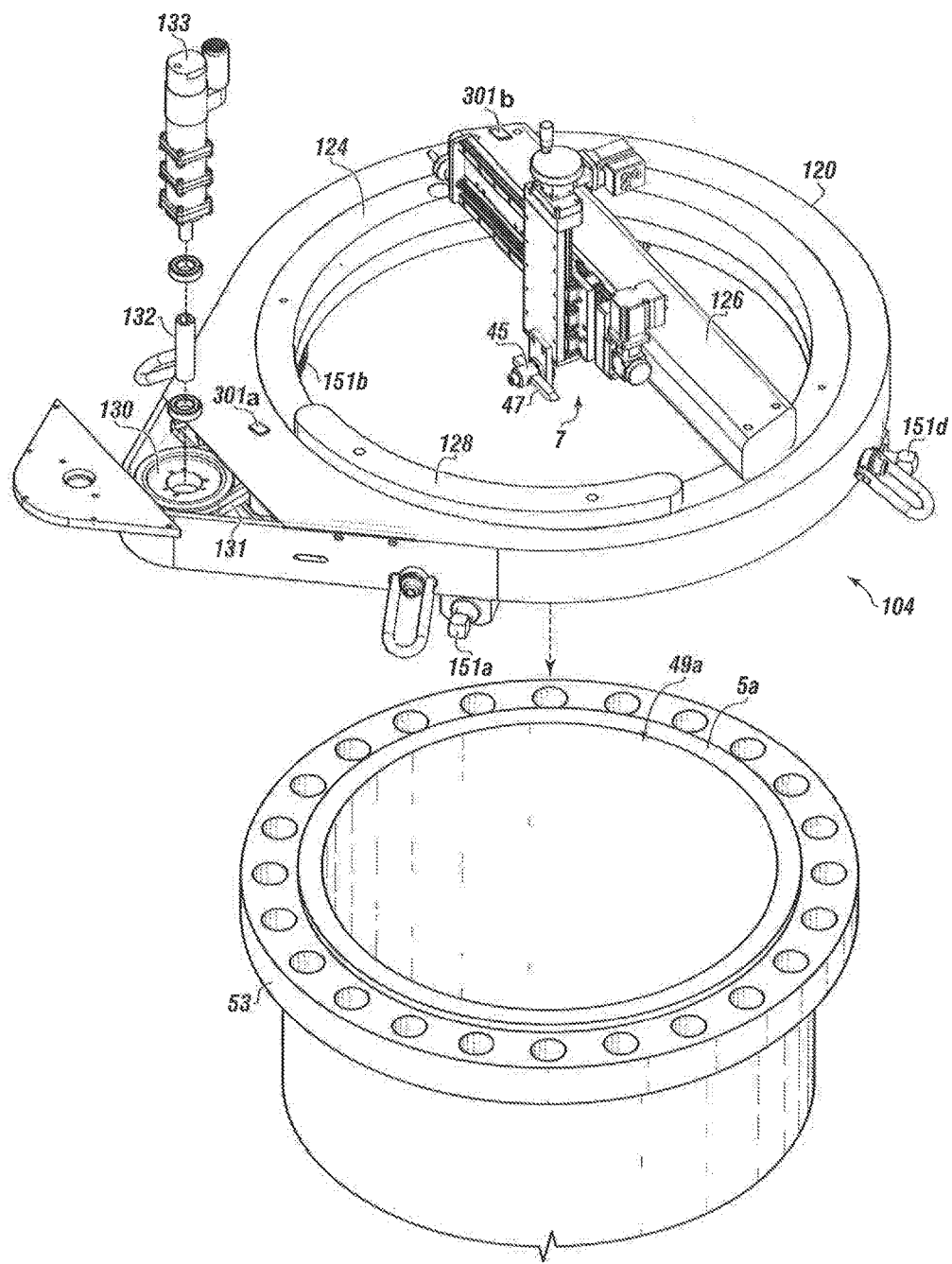
FIG. 4 is a perspective view of a safe mode cross slide portion of the system on an outer diameter mount in proximity to a target piece according to one or more embodiments.

FIG. 4 is a perspective view of a cross slide on an outer diameter mount according to one or more embodiments.

The cross slide 7 can be on an outer diameter mount 104, wherein the outer diameter mount 104 can have a frame 120 configured for engagement with a target piece 5a. The mount 104 can include connectors 151a-151d that couple the mount to a surface 53 of the target piece. In embodiments, the target piece 5a can have a bore 49a. The connectors 151a-151d can be screw-adjustable through the frame 120.

An outer diameter mount cross arm 126 can be mounted across the frame 120 to the ring 124. The outer diameter mount cross arm 126 can operably couple the mount 104 with the cross slide 7.

The outer diameter mount cross arm 126 can have a proximity switch (or sensor) 301a mounted thereto. The proximity switch 301a can provide the ability to trigger a controller such as processor to go through a cycle of feed until a programmed path is completed. This can be accomplished with, for example, in connection a remote communications hub processor in bidirectional communication with a network or a local communications hub processor.

The proximity switch (or sensor) 301a work in connection with a reference point 301b, whereby the reference point helps facilitate or promote, for example, an induction to proximity switch 301a that causes a signal to be sent.

In embodiments, the signal can be transmitted via a cross arm receiver-transmitter to the remote a remote communications hub processor. The cross arm receiver-transmitter can be in bidirectional communication with the remote communications hub processor. This means that the drive(s) (or motor(s)) can be operable to cause rotation, including incrementally, of the ring 124.

In embodiments, the signal can be transmitted via the local communications hub processor, wherein the local communications hub processor uses manual switches to communicates bidirectionally with the first and second servo motors with a computer readable media and preset X distances of travel for the saddle; preset Y distance of travel for the saddle; and instructions in the computer readable media to instruct the communications hub processor to control the first drive and the second drive independently in safe mode, causing the cross slide to only incrementally advance the saddle for the preset distances of travel.

In another embodiment, the signal can be transmitted via a cross arm receiver-transmitter to the remote a remote communications hub processor, wherein upon loss of communication with the network, the remote communications processor can automatically shut down and controlled with the local communications hub processor.

A counterweight 128 can be mounted on the ring 124. The counterweight 128 can be configured to counterbalance the outer diameter mount cross arm 126, which is useful for when the ring 124 is rotating.

A drive pulley 130 with a drive belt 131 can be operably engaged to the ring 124. A drive motor 133 (via a drive tube 132) can engage the drive pulley 130. The drive motor 133 can be operable to in turn move the drive belt 131, thus resulting in rotation of the ring 124.

The drive motor 133 can rotate the drive tube 132, and thus the drive pulley 130. As the drive tube 132 rotates the drive pulley 130, the drive pulley 130 moves (such as rotates) the drive belt 131 around the ring 124. The ring 124 can be rotated by the drive motor 133 while the frame 120 is connected to the target piece 5a.

The ring 124 can be rotated at a fixed or variable speed. In an embodiment the speed of rotation of the ring 124 can be in the range of about 0 rpm to about 100 rpm. In an embodiment the rate of spin or rotation can be in a range of about 30 rpm to about 50 rpm. Rate can also be measured in "inches per minute" (IPM), which can be dependent upon one or more dimensions of the target piece 5a.

Performance of the cross slide system can be monitored, such as by the administrative processor/data storage. Related programming can include instructions for monitoring, for example, performance of the motors 20, 54. In normal operation the motors 20, 54 can have a measurable performance variable, such as current, that fluctuates within a certain range. If the performance variable exceeds the range for a certain time, computer instructions withdraw the tool insert from the target piece, or initiate a system shutoff. An operator can then be alerted, such as via an alarm or a warning, and can go change the tool insert or troubleshoot the problem. Once resolved, the system can be reinitiated.

Oscillation of a performance variable can occur when, for example, there is vibration, wobbling, chattering, etc., which can be caused by a weld defect in the target piece or a worn out tool insert.

Figure 5:
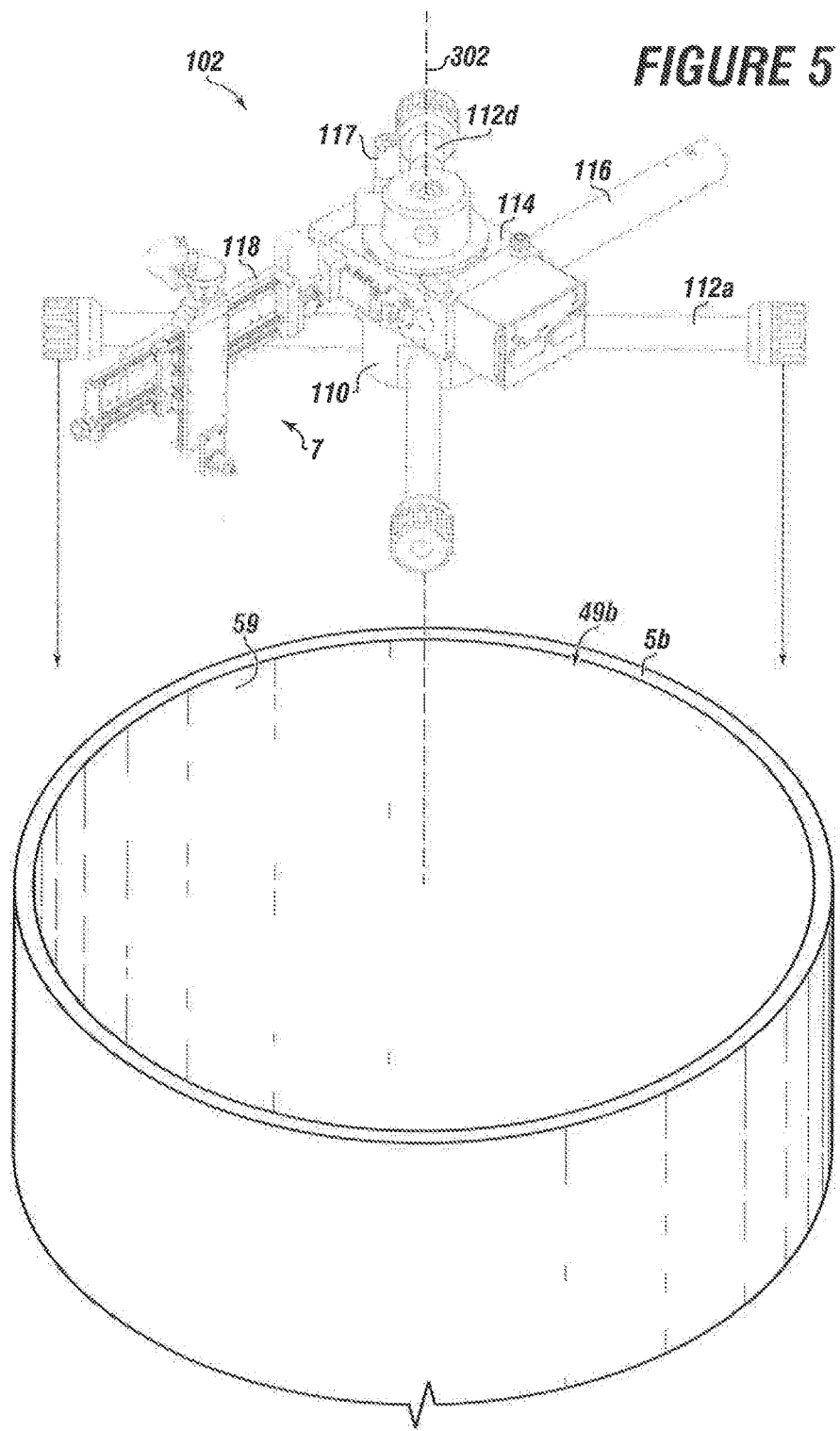
FIG. 5 is a perspective view of a cross slide portion of a safe mode cross slide system on an inner diameter mount in proximity to a target piece according to one or more embodiments.

FIG. 5 is a perspective view of a cross slide on an inner diameter mount according to one or more embodiments.

The cross slide 7 can be connected to an inner diameter mount 102. The mount 102 can include a plurality of adjustable legs 112a-112d can be connected to a central hub 110. In a non-limiting example, there can be about two to about seven adjustable legs.

The plurality of adjustable legs adjustably 112a-112d can extend within a bore 49b to engage the target piece 5b at an inner bore surface 59.

The mount 102 can include an inner diameter mount gear box 114 (with requisite gearing) operably engaged with an inner diameter mount motor 117 (such as with a motor shaft—not shown). The inner diameter mount gear box 114 and the inner diameter mount motor 117 can be mounted to the central hub 110. There can be an inner diameter mount counterweight 116 mounted to the central hub 110. The inner diameter mount counterweight 116 can be mounted, such as pivotably or rotatingly, to the central hub 110. The central hub 110 can include bearings or bearing housing to assist rotational motion.

An inner diameter mount cross arm 118 can be mounted, such as rotatingly, to the central hub 110. The cross slide 7 (via back plate 10) can be mounted to the inner diameter mount cross arm 118. The inner diameter mount cross arm 118 can be mounted to the central hub 110 in a position that is axially opposite from where the inner diameter mount counterweight 116 is mounted to the central hub 110. The inner diameter mount cross arm 118 can be configured to support the cross slide 7 connected therewith.

The inner diameter mount motor 117 (or motor shaft—not shown) can rotate the inner diameter mount gear box 114 (via gearing). The inner diameter mount gear box 114 can be operably connected in a manner that allows motion to be transferred therefrom in order to rotate or otherwise move the inner diameter mount cross arm 118 and the inner diameter mount counter weight 116 around a central axis 302 of the central hub 110.

Figure 6:
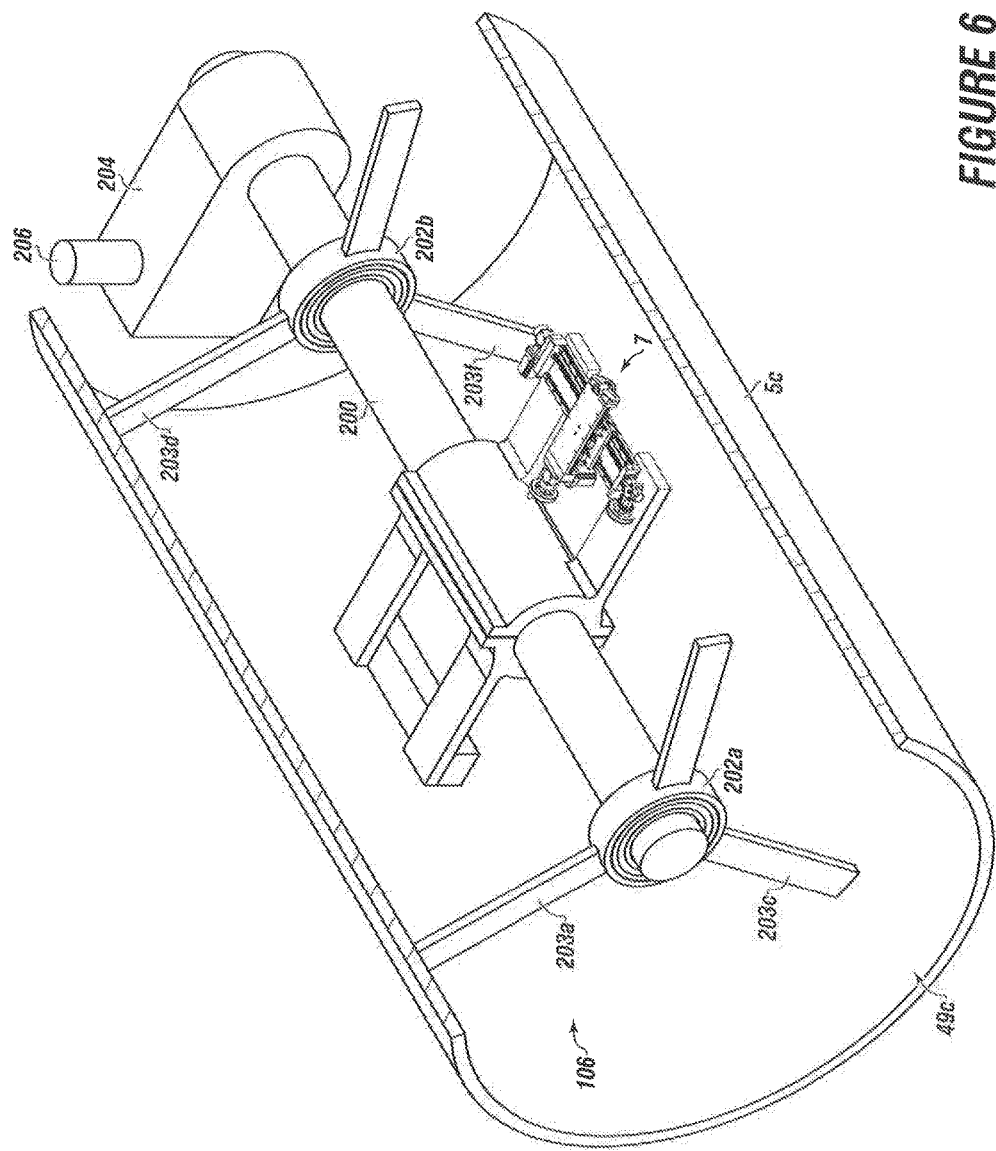
FIG. 6 is an isometric partial cross-sectional view of a safe mode cross slide system on a portable boring bar proximate to a target piece according to one or more embodiments.

FIG. 6 is an isometric partial cross-sectional view of the cross slide on a portable boring bar within a target piece according to one or more embodiments.

The cross slide 7 can be on a portable boring bar 106, wherein the portable boring bar 106 can have a boring spindle 200, which can be used for supporting the cross slide 7.

The portable boring bar 106 can have a plurality of boring bar bearings 202a and 202b which can be coupled to the boring spindle 200. The plurality of boring bar bearings 202a and 202b can be positioned on opposite sides of the cross slide 7. Arms 203a-203f can extend from the plurality of boring bar bearings 202a and 202b. The arms 203a-203f can be suitable for centralizing the portable boring bar 106 within a target piece 5C. In embodiments, the target piece Sc can have a bore 49c.

The portable boring bar 106 can have a boring bar gear box 204 (with requisite gearing) attached to the boring spindle 200. The boring bar gear box 204 can be operably engaged with a drive 206. The drive 206 can be hydraulic, electric, pneumatic, or any other suitable drive suitable to induce motion to gearing. In embodiments the drive 206 can be operably connected to the boring bar gear box 204 in a manner that results in rotation of boring spindle 200. As the boring spindle 200 rotates, the cross slide 7 attached thereto can also rotate such that material can be removed from the bore of the target piece. The material can be removed in a manner that results in the target piece being satisfactorily within a specification profile.

FIG. 7 depicts a remote control usable with the system according to one or more embodiments.

The remote control unit 800 can include a number of components contained on or within a housing 801. The remote control 800 can include a remote control processor display 808. The remote control processor display 808 can be a display device that includes one or more processor(s) therein. The remote control processor display 808 can be an operable touchscreen.

The remote control 800 can be made of suitable materials and components so that it is safe to use in dangerous areas, whereby the remote control 800 can have NEMA-approved components and housing.

In embodiments the remote control processor display 808 can connect to a remote control processor (not shown). The remote control processer can communicate with a remote control receiver-transmitter 804. The remote control receiver-transmitter 804 can receive and provide bidirectional commands via hardline or wireless connection. In an embodiment the remote control 800 can be configured to receive and provide bidirectional commands (including via the network 65, FIG. 1) to the cross slide.

The remote control processor can be electrically connected to a manually operable remote control power button 806. The remote control power button 806 can be an "e-stop" (electronic stop). The remote control power button 806 can be configured to perform as an on or off power switch that can remotely activate or deactivate the first servo motor, the second servo motor, or both the first servo motor and the second servo motor.

Now follows a non-limiting example of a process for utilizing a safe mode cross slide system in accordance with embodiments of the present disclosure.

An operator or other user determines a target piece, such as a flange of a heat exchanger, is out of specification. Instead of having to disconnect or cut the target piece from the process, the operator can use embodiments of the present disclosure to bring the target piece within specification. The operator can select an applicable portable cross slide mount (with cross slide), which will depend on the job to be performed. The operator can connect the cross slide mount to the target work piece. Once connected the system can be powered on so that a human interface (with a computer) is now useable.

The operator can use the interface to access and navigate a library of specification profiles, such as a specification profile related to the flange. The specification profile can include data pertaining to the flange face, the flange thickness, and any applicable tolerances. The operator then selects the applicable specification profile.

Once selected, the system can be initiated to begin the machining process at hand. The portable and safe mode system can be operated through a human machine interface (or touchscreen) of a remote control unit. At a predetermined time the operator can stop (or pause) the system to do a visual or mechanical check. If the target piece is not within specification, the system is restarted, and the process continues until the next stop. The system can be incremented to cut a depth of 1" to 0.001" in a single pass, and the process repeated until a desired result is achieved.

Once the target piece is within specification, the system can be shut down, the mount can be removed from the target piece, and the target piece can be reconnected to the process.

Advantages

Embodiments disclosed herein provide for a cross slide system that can be portable and used onsite, which means equipment does not have to be cut out or removed from its location. This results in a significant reduction in process downtime. When equipment has to be removed and brought to a shop, the equipment may leak residual hazardous waste or other harmful materials. The use of the slide system disclosed herein eliminates this hazard.

Embodiments disclosed herein provide for a cross slide system designed to be mobile, wireless, preprogrammed, and can have a manual interface with a touchscreen.

Embodiments of the disclosure provide the advantage of being attractive to a modern work force. The modern world is a digital world, and the modern work force desires to use a computer or 'app' to accomplish a task.

Another advantage of the disclosure is the ability for an operator to interface with the system to meet, with high accuracy, an applicable specification profile. This means the remachining process can be successfully performed without taking additional time to redo or make corrections.

Beneficially the system does not have to be touched by an operator while it is running; the system can be operated with a remote control. Thus, the safety factor to operators is improved.

While preferred embodiments of the disclosure have been shown and described, modifications thereof can be made by one skilled in the art without departing from the spirit and teachings of the disclosure. The embodiments described herein are exemplary only, and are not intended to be limiting. Many variations and modifications of embodiments disclosed herein are possible and are within the scope of the disclosure. Where numerical ranges or limitations are expressly stated, such express ranges or limitations should be understood to include iterative ranges or limitations of like magnitude falling within the expressly stated ranges or limitations. The use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

Accordingly, the scope of protection is not limited by the description set out above but is only limited by the claims which follow, that scope including all equivalents of the subject matter of the claims. Each and every claim is incorporated into the specification as an embodiment of the present disclosure. Thus, the claims are a further description and are an addition to the preferred embodiments of the present disclosure. The inclusion or discussion of a reference is not an admission that it is prior art to the present disclosure, especially any reference that can have a publication date after the priority date of this application. The disclosures of all patents, patent applications, and publications cited herein are hereby incorporated by reference, to the extent they provide background knowledge; or exemplary, procedural or other details supplementary to those set forth herein.

What is claimed is:

1. A safe mode automated cross slide system for cutting a target piece in safe mode comprising:
   a. a cross slide comprising:
      (i) a back plate assembly comprising:
         (a) a back plate;
         (b) a back plate support member;
         (c) a pair of back plate end caps disposed on opposite ends of the back plate support member;
         (d) a pair of back plate linear guides mounted longitudinally to the back plate support member;
         (e) a first ball screw;
         (f) a first gear box mounted to at least one of the pair of back plate end caps;
         (g) a first servo motor connected between a first gear box and a first drive; and
      (ii) a front plate assembly mounted to the back plate assembly comprising:
         (a) a front plate;
         (b) a tool holder mounted to the front plate, the tool holder configured to securely hold a tool insert;
         (c) a pair of front plate end caps mounted to the front plate;
         (d) a pair of front plate linear guides mounted longitudinally to the front plate and traverse to the back plate support member;
         (e) a second ball screw;
         (f) a second gear box mounted to at least one of the pair of the front plate end caps; and
         (g) a second servo motor connected between the second gear box and a second drive configured to operate independently of the first servo motor;
      (iii) a saddle mounted between the back plate and the front plate;
   b. a power supply electrically connected to both the first drive and the second drive;
   c. a communications hub in communication with the first drive, the second drive, or both the first drive and the second drive, and a communications hub processor, wherein the communications hub processor is at least one of a remote communications hub processor in bidirectional communication with a network or a local communications hub processor;
   d. a proximity switch mounted to the back plate support member, configured to trigger the communication hub processor and proceed through a cycle of feed until a programmed path is completed; and
   e. a mount for supporting the cross slide on the target piece or in the target piece.

2. The safe mode automated cross slide of claim 1, wherein the local communications hub processor uses manual switches to communicate bidirectionally with the first and second servo motors with a computer readable media and preset X distances of travel for the saddle; preset Y distance of travel for the saddle; and instructions in the computer readable media to instruct the communications hub processor to control the first drive and the second drive independently in safe mode, causing the cross slide to only incrementally advance the saddle for the preset distances of travel.

3. The safe mode cross slide system of claim 2, wherein the preset X distances of travel for the saddle are from zero to 500 RMS rates of travel for the tool holder to cut a target piece and form a phonographic finish.

4. The safe mode cross slide system of claim 2, wherein the preset y distances of travel for the saddle are from zero to 500 RMS rates of travel for the tool holder to cut a target piece and form a phonographic finish.

5. The safe mode automated cross slide system of claim 1, wherein upon loss of communication with the network, the remote communications processor can automatically shut down and be controlled with the local communications hub processor.

6. The safe mode cross slide system of claim 1, wherein the mount is an inner diameter mount, an outer diameter mount or a portable boring bar.

7. The safe mode cross slide system of claim 6, wherein the inner diameter mount comprises:
   a. a central hub;
   b. a plurality of adjustable legs connected to the central hub, the plurality of adjustable legs configured to extend within a bore of the target piece;
   c. an inner diameter mount gear box with an inner diameter mount motor mounted to the central hub;
   d. an inner diameter mount counterweight pivotably mounted to the central hub; and
   e. an inner diameter mount cross arm pivotably mounted to the central hub opposite the inner diameter mount counterweight, wherein the cross slide mounts to the inner diameter mount cross arm, the inner diameter mount motor drives the inner diameter mount gear box to rotate the inner diameter mount cross arm and the inner diameter mount counterweight around a central axis.

8. The safe mode cross slide system of claim 6, wherein the outer diameter mount comprises:
   a. a frame for engaging the target piece;
   b. a plurality of rollers mounted in the frame;
   c. a ring mounted over the plurality of rollers;
   d. an outer diameter mount cross arm mounted across the ring;
   e. a counterweight mounted on the ring to counterbalance the outer diameter mount cross arm;
   f. a drive pulley connected to the ring with a drive belt; and
   g. a drive tube with a drive motor operatively connected to the drive belt, wherein the cross slide mounts to the outer diameter mount cross arm, the drive motor rotates the drive tube, the drive tube rotates the drive pulley, the drive pulley rotates the ring while attached to the target piece.

9. The safe mode cross slide system of claim 6, wherein the portable boring bar comprises:
   a. a boring spindle for supporting the cross slide;
   b. a plurality of boring bar bearings attached to the boring bar;
   c. a boring bar gear box attached to the boring bar; and
   d. a drive connected to the boring bar gear box for rotating the portable boring bar with the cross slide attached to remove material from the target piece.

10. The safe mode cross slide system of claim 1, wherein the saddle comprises a front plate ball screw holder and a back plate ball screw holder, wherein the front plate ball screw holder and the back plate ball screw holder are configured to hold the first ball screw and the second ball screw simultaneously in a transverse orientation.

11. The safe mode cross slide system of claim 10, wherein the saddle further comprises a saddle support member, a plurality of back plate linear bearings mounted to the saddle support member for engaging the back plate support member, and a plurality of front plate linear bearings mounted to the saddle support member on a side opposite the plurality of back plate linear bearings for engaging the front plate support member.

12. The safe mode cross slide system of claim 1, wherein the back plate further comprises a first manual feed knob connected to the first ball screw opposite the first gear box, wherein the first ball screw is mounted in parallel with the pair of back plate linear guides and projecting through the pair of back plate end caps, wherein the second ball screw is mounted in parallel with the pair of front plate linear guides and projecting through the pair of front plate end caps.

13. A safe mode cross slide system for cutting a target piece comprising:
   a. a cross slide comprising:
      (i) a back plate comprising:
         (a) a back plate support member;
         (b) a pair of back plate end caps mounted on opposite ends of the back plate support member;
         (c) a pair of back plate linear guides mounted longitudinally to the back plate support member;
         (d) a first ball screw mounted in parallel with the pair of back plate linear guides and projecting through the pair of back plate end caps;
         (e) a first gear box mounted to at least one of the pair of back plate end caps, and operatively engaged with the first ball screw;
         (f) a first servo motor connected between the first gear box and a first drive; and
         (g) a first manual feed knob connected to an end of the first ball screw that is opposite the first gear box;
      (ii) a front plate mounted to the back plate comprising:
         (a) a front plate support member;
         (b) a pair of front plate end caps mounted to the front plate support member;
         (c) a pair of front plate linear guides mounted longitudinally to the front plate support member and traverse to the back plate support member;
         (d) a second ball screw mounted in parallel with the pair of front plate linear guides, and projecting through the pair of front plate end caps;
         (e) a second gear box operatively connected to the second ball screw, and mounted to at least one of the pair of the front plate end caps;
         (f) a second servo motor connected between the second gear box and a second drive; and
         (g) a second manual feed knob protruding from the second gear box and operatively connected to the second ball screw; and
      (iii) a saddle mounted between the back plate and the front plate comprising:
         (a) a saddle support member;
         (b) a plurality of back plate linear bearings mounted to the saddle support member, and configured to engage the back plate support member; and
         (c) a plurality of front plate linear bearings mounted to the saddle support member on a side opposite the plurality of back plate linear bearings, and configured to engage the front plate support member;
   b. a power supply electrically connected to both the first drive and the second drive;
   c. a communications hub in communication with the first drive, the second drive, or both the first drive and the second drive, a communications hub processor, wherein the communications hub processor is at least one of a remote communications hub processor in bidirectional communication with a network or a local communications hub processor, wherein the local communications hub processor uses manual switches to communicates bidirectionally with the first and second servo motors with a computer readable media and preset X distances of travel for the saddle; preset Y distance of travel for the saddle; and instructions in the computer readable media to instruct the communications hub processor to control the first drive and the second drive independently in safe mode, causing the cross slide to only incrementally advance the saddle for the preset distances of travel;

d. a proximity switch mounted to the back plate support member, configured to trigger the communication hub processor and proceed through a cycle of feed until a programmed path is completed; and e. a mount for supporting the cross slide on the target piece or in the target piece.

14. The safe mode cross slide system of claim 13, wherein the preset X distances of travel for the saddle are from zero to 00 RMS rates of travel for the tool holder to cut a target piece and form a phonographic finish.

15. The safe mode cross slide system of claim 13, wherein the preset y distances of travel for the saddle are from zero to 500 RMS rates of travel for the tool holder to cut a target piece and form a phonographic finish.

16. The safe mode cross slide system of claim 13, wherein the mount is one of an inner diameter mount, an outer diameter mount, and a boring bar.

17. The safe mode cross slide system of claim 13, wherein an inner diameter mount comprises:

a. a central hub;

b. a plurality of adjustable legs connected to the central hub, the plurality of adjustable legs configured to extend within a bore of the target piece;

c. an inner diameter mount gear box with an inner diameter mount motor mounted to the central hub;

d. an inner diameter mount counterweight mounted to the central hub; and e. an inner diameter mount cross arm pivotably mounted to the central hub opposite the inner diameter mount counterweight, wherein the cross slide mounts to the inner diameter mount cross arm, the inner diameter mount motor drives the inner diameter mount gear box to rotate the inner diameter mount cross arm and the inner diameter mount counter weight around a central axis.

18. The safe mode cross slide system of claim 13, wherein an outer diameter mount comprises:

a. a frame for engaging the target piece;

b. a plurality of rollers mounted in the frame;

c. a ring mounted over the plurality of rollers;

d. an outer diameter mount cross arm mounted across the ring;

e. a counterweight mounted on the ring to counterbalance the outer diameter mount cross arm;

f. a drive pulley connected to the ring with a drive belt; and g. a drive tube with a drive motor operatively connected to the drive belt, wherein the cross slide mounts to the outer diameter mount cross arm, the drive motor rotates the drive tube, the drive tube rotates the drive pulley, and the drive pulley rotates the ring while attached to the target piece.

19. The safe mode cross slide system of claim 13, wherein a boring bar comprises:

a. a boring bar for supporting the cross slide;

b. a plurality of boring bar bearings attached to the boring bar;

c. a boring bar gear box attached to the boring bar; and d. a drive connected to the boring bar gear box, the drive configured to rotate the boring bar with the cross slide attached in order to remove material from the target piece.

20. The safe mode cross slide system of claim 13, wherein the saddle comprises a front plate ball screw holder and a back plate ball screw holder, and wherein the front plate ball screw holder and the back plate ball screw holder are configured to hold the first ball screw and the second ball screw simultaneously in a transverse orientation.

* * * * *